United States Patent

Wakatsuki et al.

[11] 4,188,834
[45] Feb. 19, 1980

[54] OPERATING DEVICE

[75] Inventors: Goroei Wakatsuki, Saitama; Takeshi Hashimoto, Tachikawa, both of Japan

[73] Assignee: Honda Giken Kogyo Kabushiki Kaisha, Tokyo, Japan

[21] Appl. No.: 817,964

[22] Filed: Jul. 22, 1977

[30] Foreign Application Priority Data

Jun. 8, 1976 [JP] Japan .................... 51-105204[U]

[51] Int. Cl.[2] .............. F02N 35/18; G05G 11/00; F16D 23/00
[52] U.S. Cl. ........................... 74/489; 74/6; 192/3 R
[58] Field of Search ............... 192/3 R, 1; 74/6, 489

[56] References Cited

U.S. PATENT DOCUMENTS

| 2,540,926 | 2/1951 | Zook | 74/489 |
| 3,495,692 | 2/1970 | Holgate | 192/3 R |
| 3,830,110 | 8/1974 | Suzuki | 74/6 |
| 3,856,123 | 12/1974 | Kinsey | 74/489 |

Primary Examiner—Samuel Scott
Assistant Examiner—Wesley S. Ratliff, Jr.
Attorney, Agent, or Firm—Irving M. Weiner; Pamela S. Burt; Melvin Yedlin

[57] ABSTRACT

An operating device selectively connects and disconnects a first operating system with a second operating system. The first operating system has a frequently used operating piece, such as a brake lever. The second operating system would conventionally have an infrequently used operating piece, such as a starting lever. Switching means selectively connects and disconnects the first and second operating systems so that the systems may be operated simultaneously or separately by the operation of a single operating piece, such as a brake lever.

3 Claims, 8 Drawing Figures

OPERATING DEVICE

The present invention relates generally to an operating device wherein an operating system having an operating piece and an operating system having no operating piece are selectively connected and disconnected with each other so that the two operating systems may be switched to operate with one operating piece.

More particularly, the present invention relates to an operating device wherein an operating system having a frequently used operating piece, such as a brake lever, and an operating system normally having an infrequently used operating piece such as a starting lever, are connected as required with each other by a switching means so that the two operating systems may be selectively operated simultaneously or separately by the operation of one operating piece.

BACKGROUND OF THE INVENTION

In a motorcycle provided with a device for operating two operating systems with one operating piece as, for example, a power accumulating type starting device with a spiral spring or the like, in order to simplify the operating system, the brake lever and the power accumulating mechanism operating system are made integral with each other so that the operating system may be operated by the brake operation, and the engine may be started by the release of the accumulated power.

In such an operating device, because the brake is operated simultaneously with the starting of the engine, such starting running when the number of revolutions of the engine has risen to be higher than the number of connecting revolutions of the automatic clutch at the time of starting, particularly in a motorcycle having no neutral mechanism is prevented. Therefore, the operating device effectively provides safety. But, on the other hand, because one operating system is always operated integrally with the other operating system, the following problems will occur.

For motocycles provided with power accumulating type starting devices, such as disclosed in copending U.S. patent application Ser. No. 779,604, an engine starting device can have both a power accumulating means by an artificial operation, and a power accumulating means by engine power. When such starting device is applied to a motorcycle, a sprial spring or the like made to accumulate power by the frequent brake operations at the time of running will be released and will be fatigued by the repetition of such releases. This is not beneficial to the durability and life of the spring.

Further, it is necessary and desirable to simultaneously operate not only such accumulated power releasing operation system as is mentioned above and such operating systems, but also to operate two operating sytems. It is also necessary to frequently use one operating system separately from the other operating system. When an operating device having an operating piece only on one side is employed, the same problems as in the above will occur.

SUMMARY OF THE INVENTION

The present invention provides an operating device which includes a first operating system having an operating piece, and a second operating system having no operating piece. Switching means selectively connects and disconnects the first and second operating systems with each other. The switching means is provided between the first and second operating systems, and is operably and selectively connectible with the first and second operating systems. Both the first and second operating systems are selectively connected with each other by the switching means as required so as to be able to be operated simultaneously with each other by the one operating piece.

An object of the present invention is to provide an operating device provided with two operating systems and having an operating piece only in one operating system wherein both operating systems are selectively connected and disconnected with each other as required by a switching means so that the two operating systems may be operated simultaneously or separately with one operating piece.

Another object of the present invention is to provide an operating device adapted to motorcycles or the like provided with automatic power accumulating type starting devices wherein a power accumulating type starting device is operated with the operation of an operating piece, such as a brake lever. The frequently used operating piece, such as a brake lever, can be operated independently. An engine operating system is connected with the above mentioned operating system through a switching mechanism only at the time of starting the engine so that the two operating systems may be simultaneously operated as required with the one operating piece.

In particular, the present invention may be provided with a pivotally moving lever, such as a brake lever, constituting a part of a brake device and operating the brake with a cable pulling operation. An operating member is provided pivotally and adjacently to this lever and connected with an engine starting accumulated power releasing through a cable or the like. The aforementioned one operating piece is provided with a pressing engager and the other operating piece is provided with a part engaged with it so that the engager may be pressed to be connected only when both operating pieces mentioned above are engaged with each other. The other operating piece may be operated simultaneously with the operation of one operating piece, and only the operating piece provided with the lever may be operated while disengaged. Thus, there is provided an operating device wherein, in a simple structure, with one operating piece, two operating systems can be operated separately or simultaneously, and the operation is easy, positive and reliable.

DETAILED DESCRIPTION

The illustrated embodiments show embodiments applied to operating devices of motorcycles.

Figure 1:
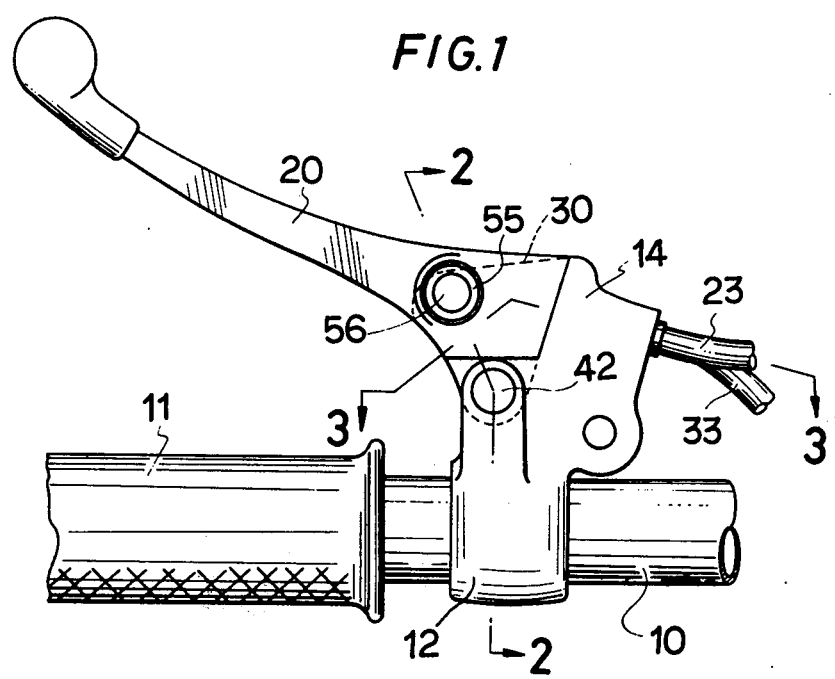
FIG. 1 is a side view of a first embodiment.
Figure 2:
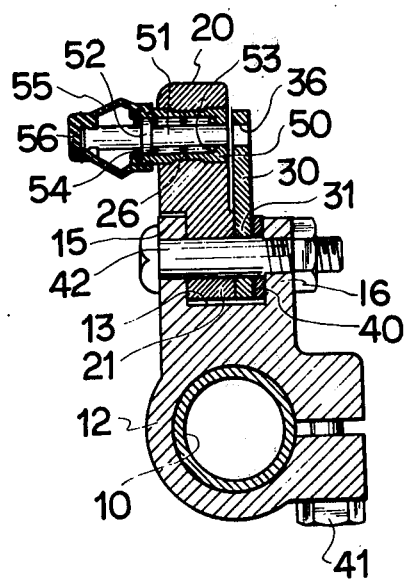
FIG. 2 is a sectional view on line 2—2 of FIG. 1.
Figure 3:
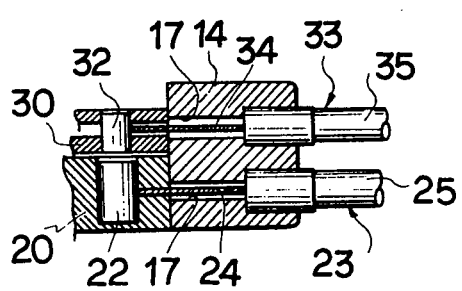
FIG. 3 is a sectional view on line 3—3 of FIG. 1, showing only essential parts.
Figure 4:
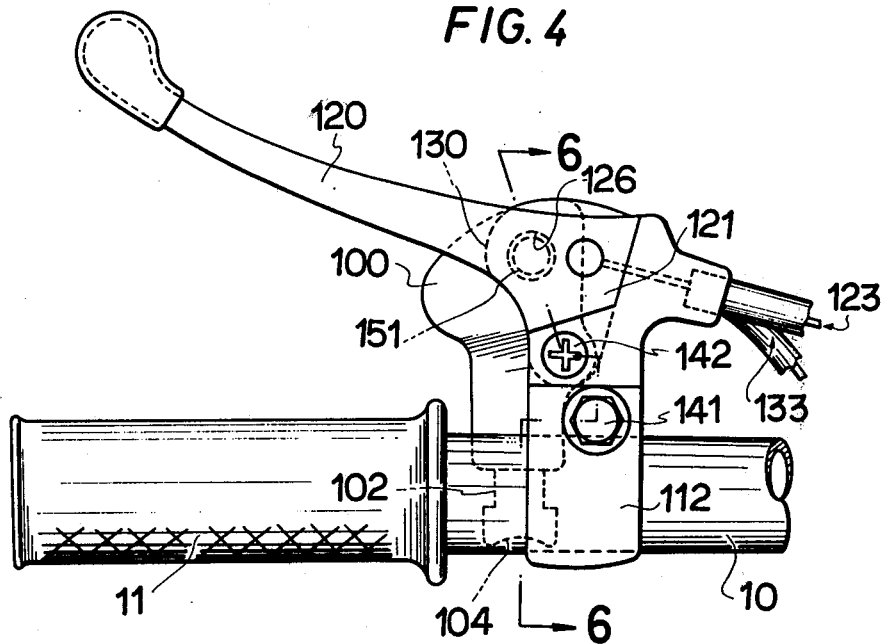
FIG. 4 is a side view of a second embodiment.
Figure 5:
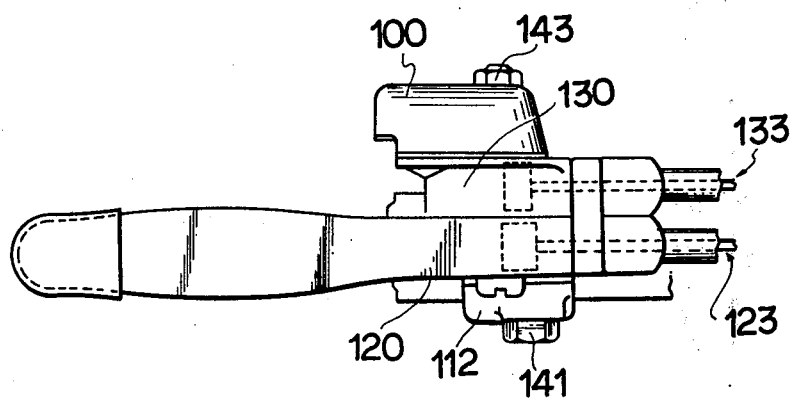
FIG. 5 is a plan view of FIG. 4.

FIGS. 1 through 3 show a brake operating part. A supporting bracket 12 is fitted so as to hold a steering handle tube 10 with a bolt 41 in front of a grip 11 provided at the end of tube 10. A fitting concavity 13 is formed in a direction parallel with the tube 10 in the upper part of the bracket 12, and a stopper part 14 is integrally formed diagonally forward upward in the front part of the upper part of bracket 12.

A brake lever 20 is fitted in its base end part 21 in the concavity 13. An arm 30 having no operating piece, such as a lever, is fitted in its base part 31 parallel and adjacent to lever 20, and is formed of a thick plate-shaped member. A spacer 40 is inserted on the side of the base part 31 of arm 30. Base part 21 of lever 20, base part 31 of arm 30, and spacer 40 are rotatably pivotable about a pin or bolt 42 provided to pass through right and left rising walls 16 and 15 and across the concavity 13.

As shown in FIG. 3, the lever 20 and arm 30 are connected respectively with inner members 24 and 34 of cables 23 and 33 by pins 22 and 32 pivotally provided in their base parts. Inner members 24 and 34 of the cables pass respectively through outer members 25 and 35 of the cables through passages 17 provided within the stopper part 14. The cables 23 connected with the lever 20 is connected with a brake device not illustrated. The cable 33 of the arm 30 is connected with a releasing operating system of a power accumulating type starting device described hereinbelow. The inner members 24 and 34 of the above mentioned respective cables are pulled by return springs or the like so that the lever 20 and arm 30 may contact at their front ends with the rear surface of the stopper to be held in the position illustrated in FIG. 1.

A through hole 26 is provided so as to cross in the width direction in the base part of the brake lever 20 separated from the pin 42 and overlapping the parallelly provided arm 30 and is fitted with a cylinder member 50 in which a plunger-shaped push rod 51 which is an engaging member of both members 20 and 30 is slidably fitted. A piston part 52 is provided in the intermediate portion of the push rod 51. A return spring 53 is fitted as compressed between this piston part 52 and the large diameter stepped part of the cylinder member 50 so as to always resiliently press the rod 51 axially outwardly. The piston part 52 contacts a stopper 54 provided at the outside opening end of the cylinder part 50 to prevent the rod 51 from coming out. The tip of the rod 51 is held in a position in which it does not project out of the surface of the lever 20 opposed to the arm 30. The base part of the push rod 51 projects on the outside surface of the lever 20 and is covered with a cover 55. The base end part of the rod 51 is engaged with the thick end part 56 of the cover 55.

On the other hand, an engaging hole 36 of a diameter fitting the tip part of the rod 51 is made through the part of the arm 30 opposed to rod 51.

In the above, in the normal position, as shown in FIG. 2, the push rod 51 retreats under the action of the spring 53 and the lever 20 and arm 30 are isolated from each other. Therefore, when the lever 20 is gripped and pressed toward the grip 11, only the lever 20 will pivotally move with the pin 42 as a fulcrum and only the cable 23 connected with this lever 20 will be pulled to operate the brake. In such case, because the arm 30 is isolated from the lever 20 as mentioned above, the arm 30 will hold the normal position indicated by the broken line in FIG. 1.

When the second operating system, that is, the arm 30, is to be operated as in starting the engine, the end part of the cover 55 is pressed with a finger tip. Thereby, the push rod 51 will advance against the spring 53 within the cylinder member 50, its tip will project and will fit in the engaging hole 36 of the arm 30 and the members 20 and 30 will be connected with each other through the rod 51. When the brake lever 20 is pressed and pivotally operated in this state, the arm 30 will pivotally move integrally with the lever 20, the cable 33 connected with the arm 30 will be pulled and this operating system will be operated. In such case, according to this embodiment, the accumulated power of the power accumulating type starting device will be released to start the engine but the throttling grip operating amount will be so large that, even if the number of revolutions rises to be higher than the number of connecting revolutions of the automatic clutch, as the brake lever 20 is being operated, starting running will be able to be prevented.

When the above mentioned pressing of the push rod 51 is released, the push rod 51 will retreat under the action of the spring 53 and will escape out of the engaging hole 36 of the arm 30 and the arm 30 will be released from the regulation by the lever 20, will be isolated from the lever and will return to the normal state. After the starting, even if the brake lever 20 is provided while running, the arm 30 will not be operated.

Figure 8:
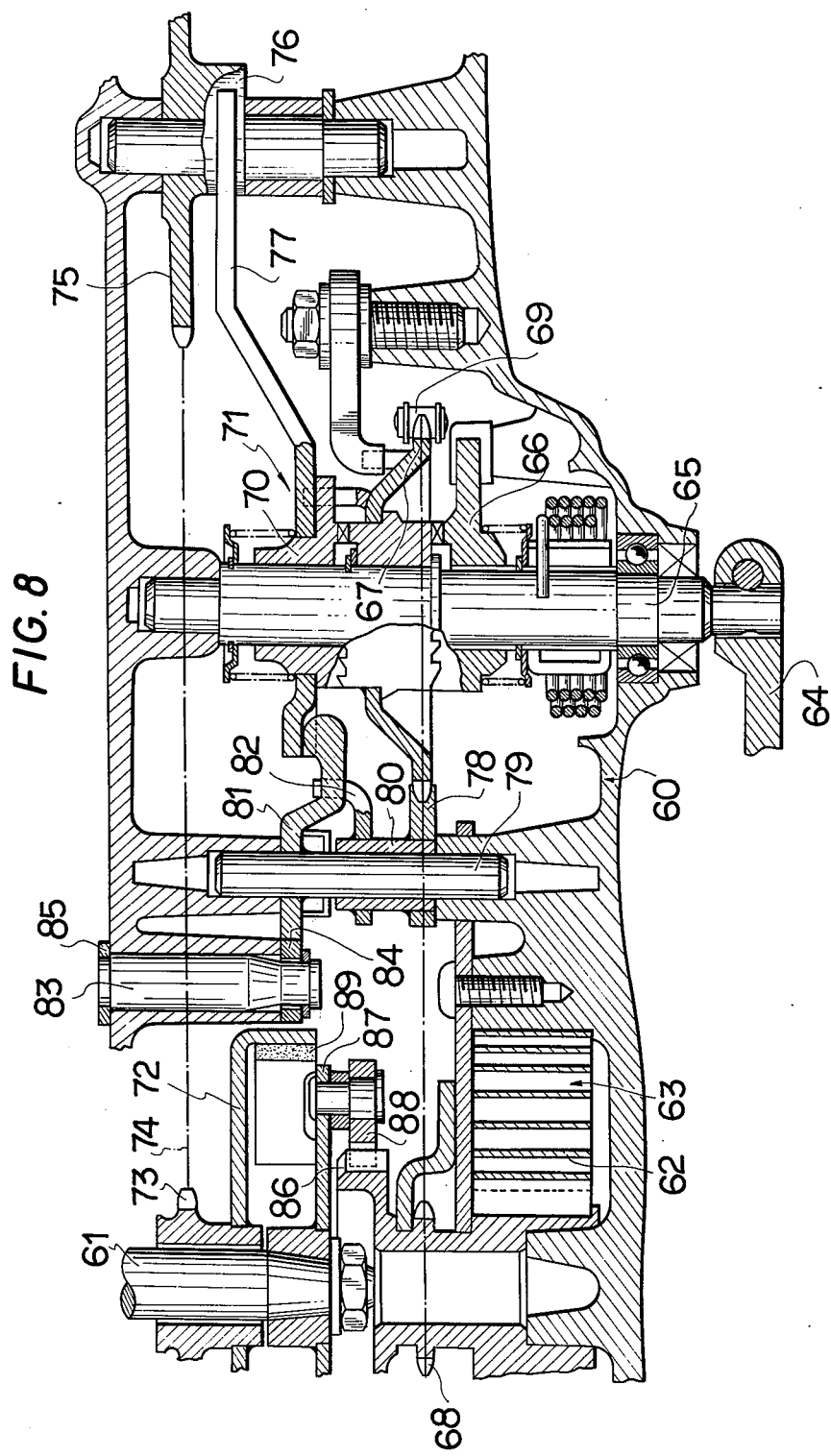
FIG. 8 is a cross-sectioned plan view of a power accumulating type starting device, for use with the present invention.

FIG. 8 shows an automatic power accumulating type engine starting device which is an embodiment of a device operated by the arm 30 which is the second operating system.

The device is fitted in a two-split integral casing 60 which is provided from the engine to the driving wheel. A power accumulating mechanism 63 by the winding of a spiral spring 62 provided on one end side of a crankshaft 61 is wound to accumulate power through a chain 69 by a winding sprocket 67 and a sprocket 68 of the power accumulating mechanism 63 through a one-way clutch 66 by the driving of a pedal shaft 65 by treading on a pedal arm 64.

Further, an engine power winding mechanism 71 having a one-way rack or clutch 70 connected with the winding sprocket 67 is provided coaxially with this pedal drive. This feeding one-way clutch 70 is fed tooth by tooth by a lever 77 rocked by a cam 76 provided on a driving sprocket 75 of a driving wheel shaft driven through a chain 74 by a sprocket 73 of a clutch outer member of the crankshaft 61 and winds the winding sprocket 67 to wind the spiral spring 62 to accumulate power. Thus, the spiral spring 62 will be wound automatically to accumulate power when running with the engine power.

In the above mentioned winding mechanism, the winding sprocket 67 is regulated by a stopper 78 to prevent its reverse rotation, to prevent the release of the wound spiral spring 62, and to keep the power accumulating state. The stopper 78 is fixed to a sleeve 80 loosely fitted on a supporting shaft 79 and is connected through an engager 82 with a lever 81 opening and releasing the clutch 70 of the automatic winding mechanism 71 fixed on shaft 79.

This lever 81 engages with an operating member 84 of an operating shaft 83 extended out at one end. An operating plate 85 is fixed to the extended end of the operating shaft, and is connected with the arm 30 through the inner member 34 of cable 33.

When the brake lever 20 and arm 30 are engaged with each other by the pressing operation of the push rod 51 and the brake lever 20 is operated, the operating shaft 83 will be rotated by the operating plate 85 through the cable 33 to thereby rotate the lever 81 with the operating member 84 and open and separate the clutch 70 of the automatic winding mechanism 71. At the same time, the stopper 78 will be released through the engager 82 to release the winding sprocket 67. As a result, the power accumulating mechanism 63 of the spiral spring 62 having the accumulated power release regulated by the sprocket 68 connected with the winding sprocket 67 will be released to rotate toward cranking. A ratchet 86 of the power accumulating mechanism 63 will engage with a pawl 88 provided on an inner member 87 of the crankshaft 61 to rotate the crankshaft 61 and start the engine. After the engine starts, centrifugally expanding type clutch shoes 89 will engage with the outer member 72 to transmit the engine power to the sprocket 75.

When such a spiral spring automatic power accumulating type starting device of a motorcycle is used as an engine starting operating device, the engine starting will be made together with the brake lever operation, the braking operation at the time of running will be made alone without releasing the accumulated power of the spiral spring and, only at the time of starting the engine, the accumulated power will be able to be released.

The brake lever is used without requiring the operating piece for starting the engine. The arm and brake lever are connected with each other only at the time of starting; the engine is started while operating the brake and, after the engine starts, both are disengaged from each other so that only one operating system may be operated.

Therefore, two independent operating systems are provided and can be respectively operated with one operating piece separately or simultaneously, and two kinds of operations can be made selectively and positively while simplifying the operating system. In the above mentioned first embodiment of a push rod type, the structure is simple, the number of parts is minimum, the operating piece on one side is omitted and, due to the mechanical structure, the operation is positive and reliable.

FIGS. 4 to 7 show a second embodiment of the present invention.

Two cavities 113a and 113b are made on a bracket 112 fitted with a bolt 141 in front of the grip 11 of the steering handle tube 10. The base part 121 of a brake lever 120 and the base part 131 of an arm 130 are fitted respectively in concavities 113a and 113b, and are pivoted with a pin 142 in the form of a bolt. A cover 100 is provided on the free outside surface of the arm 130, and is fixed to the side surface of the bracket 112 with the bolt forming the pin 142 and a nut 143 in common.

A guide hole 136 is made crosswise through the arm 130. A pin 151 is slidably fitted in this hole 136. The head 152 of the pin 151 is located in a space 101 within the cover 100. A spring 153 is fitted as compressed between the side surface of the arm 130 and the head 152 to always resiliently press and retreat the pin 151 and the tip of the pin 151 is sunk in the hole 136. A cam part 103 of a sliding rod 102 is located outside the head 152 of the pin 151 to support the head. The sliding rod 102 is extended out in the lower end part below the case 100 to provide a pressing part 104 and is regulated in the intermediate portion with a guide part 105 of the case 100 to be resiliently lowered by a spring 106.

On the other hand, an engaging concavity 126 is provided in the part opposed to the pin 151 of the inside surface of the brake lever 120.

Figure 6:
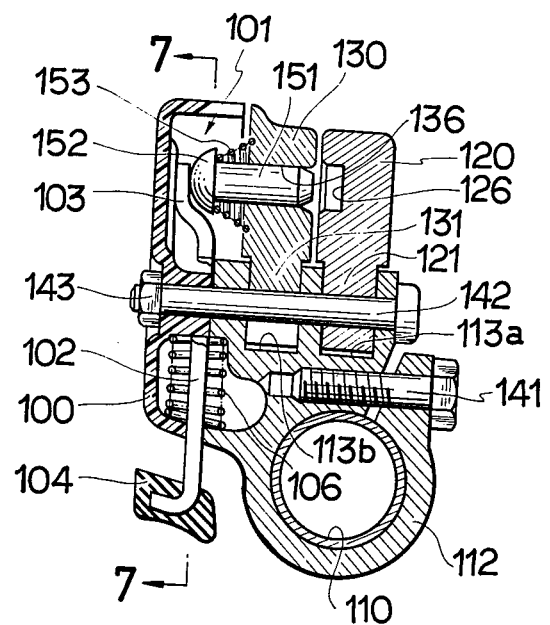
FIG. 6 is a sectioned view on line 6—6 of FIG. 4.
Figure 7:
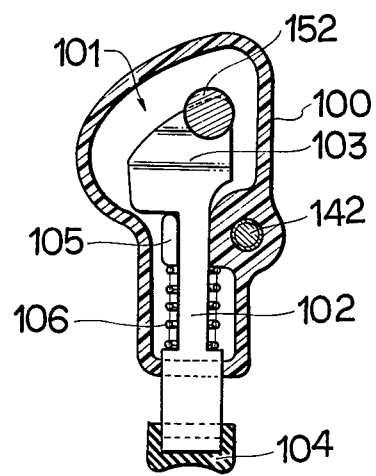
FIG. 7 is a sectioned view on line 7—7 of FIG. 6.

FIG. 6 shows the normal state in which the lever 120 and arm 130 are disengaged with each other. When the lever 120 is operated, because the arm 130 is isolated from it, only the lever 120 will pivotally move to operate the brake through the cable.

When it is desired to start the engine, the sliding rod 102 will be pushed up against the spring 106 by means of the pressing part 104. The pin head 152 will advance against the spring 153 under the action of the cam part 103, and the tip of the pin 151 will engage with the engaging concavity 126 of the lever 120 to operate the brake lever 120. Thereby, both members 120 and 130, made integral through the pin 151, will pivotally move integrally to pull the cable 133 and operate to start the engine as mentioned above.

The present invention has been explained in detail in the above. Thereby the present invention could be well understood. The embodiment as applied to the above mentioned device of a motorcycle has been described as an embodiment of the present invention but the device of the present invention is not limited to the above mentioned device.

We claim:

1. An operating device comprising:
a first operating system including a manually operable lever pivotably connected to a bracket;
a second operating system including a pivotably movable member disposed adjacent to said lever and coaxial with said lever;
said first and second operating systems being pivotably connected with a common shaft;
a switching means for selectively connecting and disconnecting said first and second operating systems with each other;
said switching means including a slidable engager disposed across one of said operating systems and a part to be engaged provided on the other of said operating systems;
said engager being resiliently pressed so that said engager and said part to be engaged are normally disengaged from each other;
both said first and second operating systems being selectively connected with each other by said switching means to permit said first and second operating systems to be selectively operated simultaneously with each other by said manually operable lever, and normally disconnected from each other by said switching means to permit said first operating system to be selectively operated by said manually operable lever while said second operating system remains inoperable;
said switching means further including a sliding member partly exposed so as to be operable from outside;
said engager comprising a pin adapted to slide across said pivotably movable member under the cam action of said member and to be resiliently pressed by a cam part of said sliding member; and
said engaged part being provided on said lever and opposed to said pin.

2. An operating device according to claim 1, wherein:
said first operating system comprises a motorcycle brake device operating system, and said lever comprises a hand brake lever connected with a brake device through a cable;
said second operating system comprises a motorcycle releasing operating system of a power accumulating starting device, and said pivotably movable member is connected with an engine starting device through a cable; and said cam action of said sliding member is adapted to slide said pin into engagement with said part to be engaged on said lever, to permit said motorcycle brake device and said motorcycle engine starting device to be operated simultaneously by said brake lever.

3. An operating device according to claim 2, further comprising:

a spring disposed on said pin for normally resiliently pressing said pin away from said part to be engaged on said lever, to permit said brake operating system to be operated by said brake lever while said engine starting operating system remains inoperable.

* * * * *